United States Patent
Simeonov et al.

(10) Patent No.: US 11,456,912 B2
(45) Date of Patent: Sep. 27, 2022

(54) AUTOMATIC SUPPRESSION OF ALERTS DURING MAINTENANCE

(71) Applicant: International Business Machines Corporation, Armonk, NY (US)

(72) Inventors: Hristo Simeonov, Brno (CZ); Sander Plug, Noordwijk (NL); Giacomo Giuseppe Chiarella, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 16/363,618

(22) Filed: Mar. 25, 2019

(65) Prior Publication Data
US 2020/0313953 A1    Oct. 1, 2020

(51) Int. Cl.
| | |
|---|---|
| *H04L 41/0604* | (2022.01) |
| *H04L 41/082* | (2022.01) |
| *H04L 41/0853* | (2022.01) |
| *H04L 41/0859* | (2022.01) |
| *H04L 41/0869* | (2022.01) |
| *G06F 40/20* | (2020.01) |

(52) U.S. Cl.
CPC .......... *H04L 41/0604* (2013.01); *G06F 40/20* (2020.01); *H04L 41/082* (2013.01); *H04L 41/0853* (2013.01); *H04L 41/0859* (2013.01); *H04L 41/0869* (2013.01)

(58) Field of Classification Search
CPC .............. H04L 41/0604; H04L 41/082; H04L 41/0869; H04L 41/0859; H04L 41/0853; G06F 40/20
See application file for complete search history.

(56) References Cited

U.S. PATENT DOCUMENTS

| | | | |
|---|---|---|---|
| 7,430,692 B2 | 9/2008 | White, III | |
| 9,325,844 B2 | 4/2016 | Ristock | |
| 10,963,333 B1* | 3/2021 | Nijim | G06F 11/079 |
| 2005/0288900 A1* | 12/2005 | Robins | G05B 23/0283 |
| | | | 702/184 |
| 2006/0015608 A1 | 1/2006 | Becker | |
| 2007/0214429 A1 | 9/2007 | Lyudovyk | |
| 2010/0250453 A1* | 9/2010 | Kawai | H04Q 9/00 |
| | | | 705/305 |
| 2012/0110600 A1 | 5/2012 | Carey | |
| 2013/0159039 A1 | 6/2013 | Brech | |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Soe Hlaing
(74) *Attorney, Agent, or Firm* — Grant M. McNeilly

(57) ABSTRACT

A method includes monitoring unstructured data related to a configuration item in a relevant source, analyzing the data using a natural language processing system, and determining that the configuration item has an event wherein the configuration item is to be maintained in response to the analysis of the data. The method also includes designating that the configuration item is in a maintenance mode and suppressing alerts related to the configuration item while the configuration item is in the maintenance mode.

18 Claims, 8 Drawing Sheets

(56) References Cited

U.S. PATENT DOCUMENTS

| | | | |
|---|---|---|---|
| 2014/0122927 A1 | 5/2014 | Yildiz | |
| 2017/0104652 A1 | 4/2017 | Balasubramanian | |
| 2018/0189130 A1* | 7/2018 | Mowry | G06F 11/0781 |
| 2019/0200244 A1* | 6/2019 | Polepalli | H04W 24/02 |
| 2020/0365262 A1* | 11/2020 | Sreenivasan | G06N 5/04 |

OTHER PUBLICATIONS

Sasidharan, "Mute Solarwinds Alerts During Reboots/ Maintenance Windows," rakhesh.com, Apr. 25, 2016, 5 pages, <https://rakhesh.com/infrastructure/mute-solarwinds-alerts-during-reboots-maintenance-windows/>.

Simeonov, "Document of Understanding for Robotic Process Automation Automated Suppression (Maintenance Mode)," IBM, Apr. 5, 2016, 15 pages.

Unknown, "Suppressing Alerts during Maintenance Window," BMC Communities, Jan. 9, 2014, 2 pages. <https://communities.bmc.com/message/388557#388557>.

Unknown, "How to: Disable Notifications for a Maintenance Window," IDERA Uptime Cloud Monitor Support, Jan. 28, 2019, 3 pages. <https://copperegg.zendesk.com/hc/en-us/articles/214635383-How-To-Disable-Notifications-for-a-Maintenance-Window>.

Wang, "Mute Datadog Alerts for Planned Downtime," Datadog, Jan. 5, 2018, 6 pages. <https://www.datadoghq.com/blog/mute-datadog-alerts-planned-downtime/>.

\* cited by examiner

FIG. 4

Weighting Table 400

| | | Information Source | | | |
|---|---|---|---|---|---|
| | | IPC Tool | IM Service | Forum | M-S Log In | Change Log |
| Maintenance Type | Installation/ Release | 1 | 2 | 3 | 1 | 3 |
| | Update/Reg. Sch. Maint. | 3 | 1 | 1 | 3 | 1 |
| | Failure | 2 | 1 | 2 | 1 | 1 |

AUTOMATIC SUPPRESSION OF ALERTS DURING MAINTENANCE

BACKGROUND

Many modern computing infrastructures include many different configuration items. A configuration item can be any service component, infrastructure element, or other item that is managed and maintained in order to ensure the successful delivery of services. Configuration items vary in complexity, size, and type. For example, a top-level configuration item can be a computer system or an entire service, which may consist of hardware, software, and documentation. These top-level configuration items can have child configuration items, such as operating systems, application software, and/or hardware components. The lowest-level configuration item can be the smallest unit that can be changed independently of other components, such as a single program module or a minor hardware component.

During maintenance of a configuration item, the configuration item may perform in a way that is normal for maintenance but abnormal compared to standard operation. If the computing structure includes automated monitoring, then remedial action may be taken that can be unnecessary or antithetical to the maintenance procedure. Thereby, it can be advantageous to track the times when a configuration item is being maintained as to prevent automated remediation from being instituted during those times. However, such maintenance ticketing systems can be burdensome to the administrators of the computing infrastructures, which can lead to the systems to be inaccurate if not updated properly.

SUMMARY

According to some embodiments of the present disclosure, a method includes monitoring unstructured data related to a configuration item in a relevant source, analyzing the data using a natural language processing system, and determining that the configuration item has an event wherein the configuration item is to be maintained in response to the analysis of the data. The method also includes designating that the configuration item is in a maintenance mode and suppressing alerts related to the configuration item while the configuration item is in the maintenance mode.

According to some embodiments of the present disclosure, a method includes monitoring information related to a configuration item in two relevant sources, weighting the information to calculate a score, and comparing the score to a threshold. The method further includes determining that the configuration item has an event wherein the configuration item is to be maintained in response to the score being greater than or equal to the threshold, designating that the configuration item is in a maintenance mode; and suppressing alerts related to the configuration item while the configuration item is in the maintenance mode.

BRIEF DESCRIPTION OF THE DRAWINGS

FIG. 4 shows a weighting table of information sources versus maintenance types according to an embodiment of the present disclosure.

DETAILED DESCRIPTION

In accordance with some embodiments of the present disclosure, a maintenance ticketing system for a computing infrastructure can be an Incident, Problem, Change (IPC) tool, and an automated monitoring system can be a monitoring and event management (MEM) tool. As will be shown and discussed henceforth in the present disclosure, a suppressing tool can interface with both the IPC tool and the MEM tool so that the MEM tool can be informed about maintenance being performed on configuration items in the computing infrastructure, even if they are not present in the IPC tool. The suppressing tool can inform the MEM tool when a configuration item is in a maintenance mode, such that alerts of anomalies related to the configuration item may be suppressed. This can prevent the MEM tool from taking unnecessary action on the configuration item that may interfere or conflict with the maintenance being performed. In addition, the suppressing tool can inform the MEM tool of when a configuration item is out of maintenance mode so that normal monitoring of the configuration item can resume.

In accordance with some embodiments of the present disclosure, the suppressing tool can monitor several relevant sources of information to determine when a configuration item is, will be, and/or should be in maintenance mode. The relevance sources of information may include unformatted text or unstructured data, which can be analyzed using natural language processing (NLP) techniques (e.g., involving computer software and/or hardware). In accordance with some embodiments of the present disclosure, each of the several relevant sources of information can be weighted according to importance (which may be based on, for example, the perceived relevance, authority, and/or veracity of the information source). For every source that indicates that a configuration item is, will be, and/or should be in maintenance mode, the weighted scores can be summed and compared to a threshold. If the sum meets a predetermined threshold value, then the configuration item can be put in maintenance mode and/or an entry can be made in the IPC that indicates that the configuration item will be maintained at a certain date and/or time.

Figure 1:
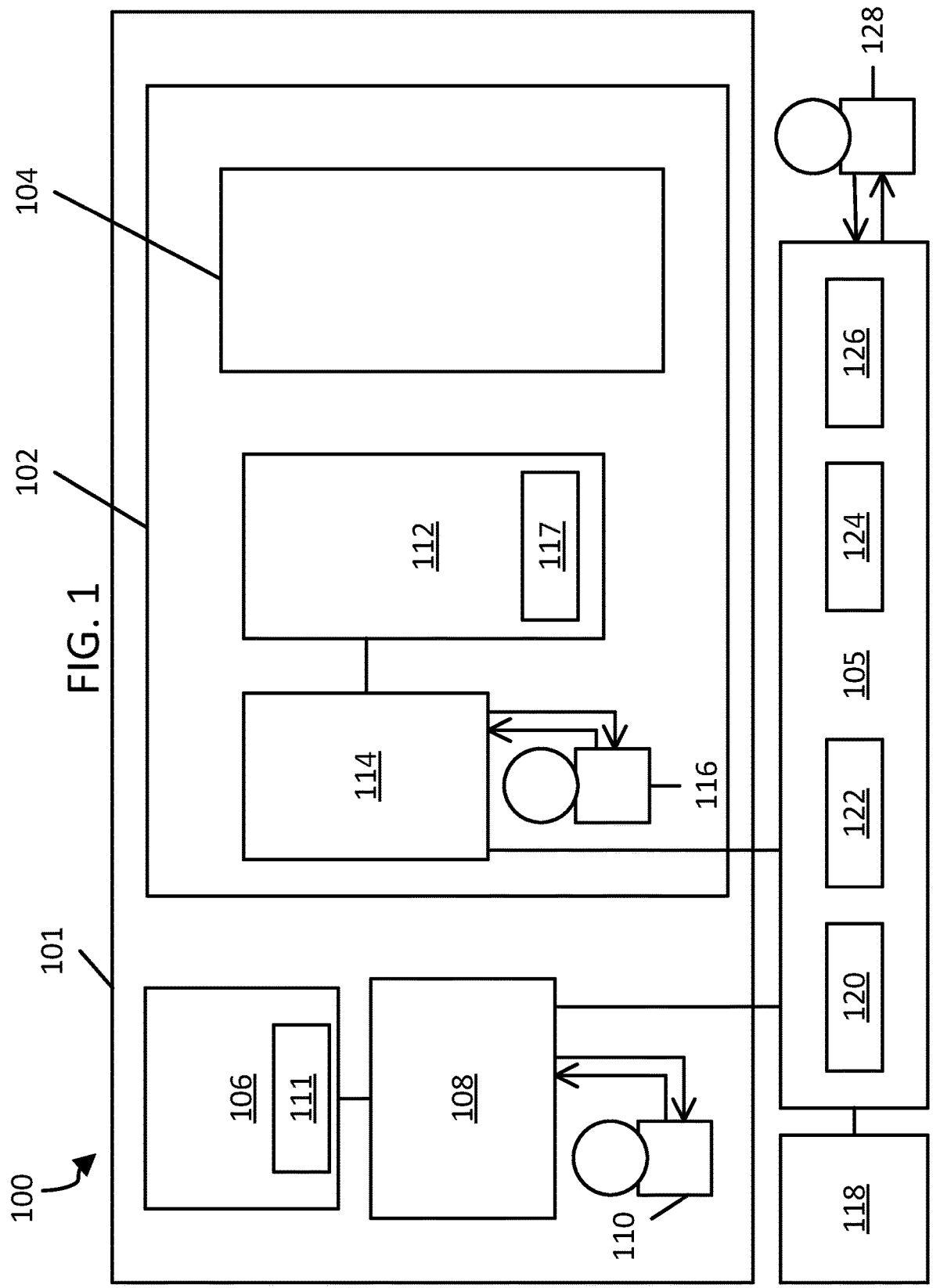
FIG. 1 shows a visual representation of some of the responsibilities and relationships of the equipment and personnel in a computing infrastructure according to an embodiment of the present disclosure.

Referring now to the Figures, FIG. 1 shows a visual representation of some of the responsibilities and relationships of the equipment and personnel in computing infrastructure 100 according to an embodiment of the present disclosure. In the illustrated embodiment, infrastructure 100 includes resource/asset domain 101, information technology (IT) applications/software domain 102, application release domain 104, and IT system 105. Resource/asset domain 101 encompasses IT applications/software domain 102 and application release domain 104, and IT applications/software domain 102 encompasses application release domain 104.

Resource/asset domain 101 includes hardware resources 106 in computing infrastructure 100, which can be considered configuration items. Resource/asset domain 101 includes resource/asset management system 108 with which infra administrator 110 can interact, for example, to maintain operating system 111 in hardware resources 106.

IT applications/software domain 102 monitors virtual machines (VMs) 112 on the operating system level. VMs 112 can be considered configuration items that are used in computing infrastructure 100. IT applications/software domain 102 includes IT applications/software management system 114. Platform administrator 116 can interact with IT applications/software management system 114, for example, to maintain software application 117 on VMs 112.

In the illustrated embodiment, IT system 105 is communicatively connected to resource/asset management system 108, applications/software management system 114, and information source 118. Information source 118 can be a data well such as, for example, the Internet, an instant messaging service, or a private intranet that includes relevant sources of information regarding the configuration items in computing infrastructure 100. IT system 105 includes MEM tool 120, IPC tool 122, suppressing tool 124, and automation engine 126. Thereby, MEM tool 120 can monitor the configuration items in computing infrastructure 100. IPC tool 122 can include a database (not shown) of maintenance activities for the configuration items. This database can include both structured/formatted (e.g., dates and times) and unstructured/unformatted data (e.g., notes on the reason for the maintenance, which can be in natural language form).

Suppressing tool 124 can find and analyze information in information source 118 that may reveal when and why configuration items will be maintained. Suppressing tool 124 can then enter a maintenance event into IPC tool 122 in response to the analyzed information. In addition to or instead, suppressing tool 124 can suppress alerts from MEM tool 120 by, for example, shutting down or disconnecting MEM tool 120, preventing automated action by MEM tool 120 on the configuration item being maintained, preventing an alert related to a configuration item being maintained from progressing through MEM tool 120, and/or intercepting the actual performance values from the configuration item being maintained and feeding simulated normal or null performance values to MEM tool 120. Automation engine 126 can enable functioning of IT system 105 automatically, with reduced need for human intervention. However, user 128 (such as an engineer, commander, console operator, support professional, and/or subject matter expert) can interact with IT system 105, for example, to control and/or maintain MEM tool 120, IPC tool 122, suppressing tool 124, and/or automation engine 126.

Figure 2:
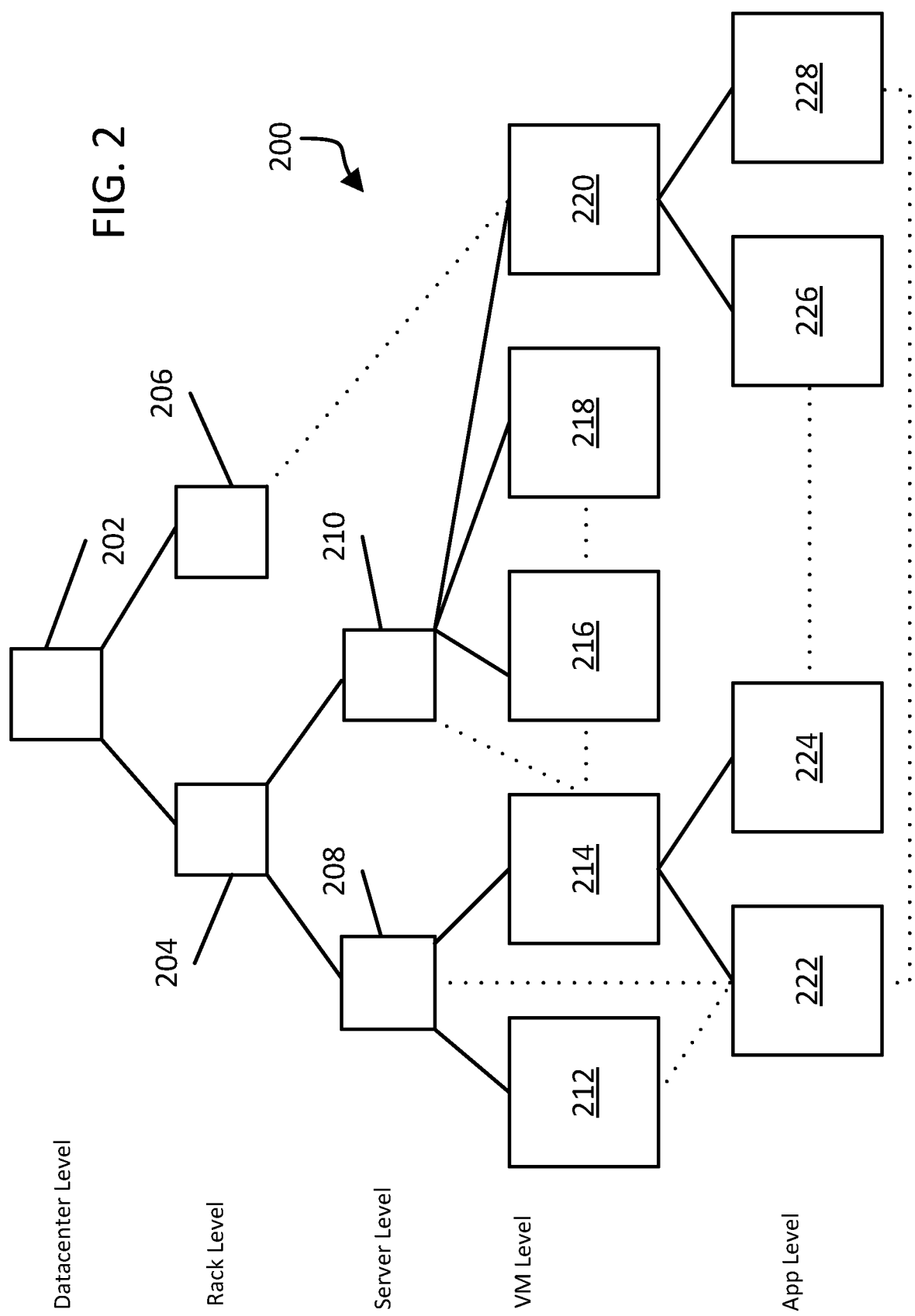
FIG. 2 shows a hierarchical representation of a computing infrastructure according to an embodiment of the present disclosure.

FIG. 2 shows a hierarchical representation of (at least a portion of) computing infrastructure 200 according to an embodiment of the present disclosure. Computing infrastructure 200 can be similar to or the same as computing infrastructure 100 (shown in FIG. 1). FIG. 2 graphically demonstrates exemplary lines of communication that some of the configuration items have with other configuration items in some embodiments of computing infrastructure 200. More specifically, when a configuration item is being maintained, other configuration items can be affected due to their communication with and/or reliance on the configuration item being serviced.

In the illustrated embodiment, the computing infrastructure 200 comprises datacenter 202; racks 204 and 206 (e.g., hardware); servers 208 and 210 (e.g., hardware); virtual machines 212, 214, 216, 218, and 220 (e.g., hardware and software); and applications 222, 224, 226, and 228 (e.g., software). According to the hierarchy, applications 222-228 are dependent on virtual machine 214 and 220, respectively, and virtual machines 212-220 are dependent on servers 208 and 210, respectively. In turn, servers 208 and 210 are dependent on rack 204, and racks 204 and 206 are dependent on datacenter 202.

However, despite the dependencies, communication and reliance between the different configuration items of computing infrastructure 200 can flow down, up, and/or across the hierarchy. Some examples of such communication are shown by phantom lines between configuration items in FIG. 2. Thereby, maintenance events for any configuration item can potentially cause an issue within computing infrastructure 200 due to, for example, downtime of the configuration item.

Figure 3:
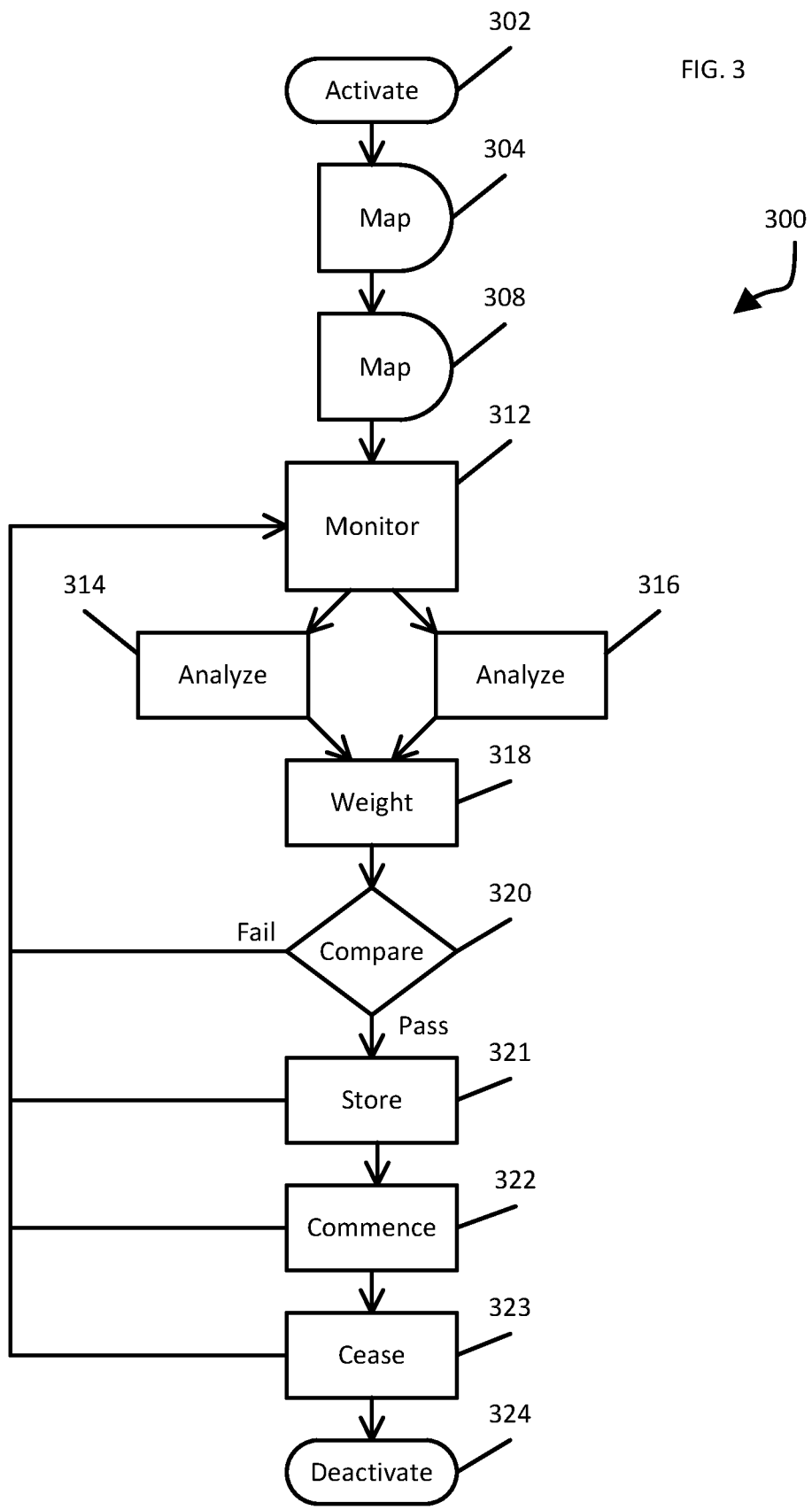
FIG. 3 shows a flowchart of a method of using a suppressing tool according to an embodiment of the present disclosure.

FIG. 3 shows a flowchart of method 300 of using a suppressing tool (such as suppressing tool 124, shown in FIG. 1) according to an embodiment of the present disclosure. Method 300 starts at polygon 302 with the suppressing tool being activated, and at polygon 304, a computing infrastructure (such as computing infrastructure 100 or 200, shown in FIGS. 1 and 2, respectively) is mapped so as to be accessible to the suppressing tool. For example, information regarding the technical specifications (e.g., versions of hardware, software, middleware, firmware, and microcode) and the relationships (e.g., hierarchy) of every configuration item in the computing infrastructure is discovered by or input into the suppressing tool from an infrastructure information well (which may be the computing infrastructure itself which can be queried by the suppressing tool).

At polygon 308, relevant sources of information regarding the configuration items are mapped so as to be accessible to and monitored by the suppressing tool. For example, information (including information that is updated in real-time) regarding the performance (e.g., installation/release, update/regularly scheduled maintenance, and failure of a configuration item) of every configuration item in the computing infrastructure is discovered by or input into the suppressing tool from a relevant information well. In some embodiments, the relevant information well is comprised of many different relevant information sources (not shown) and can be comparable to information source 118 (shown in FIG. 1). These relevant information sources can reside, for example, in a data lake, on the Internet, and/or in a company-specific intranet. In one specific embodiments, there is one relevant information source, and in another specific embodiment, there are two relevant information sources. In other embodiments there are three or more relevant information sources.

In some embodiments, the relevant information sources can be of different types, such as, for example, a maintenance ticketing/scheduling/approval system (such as IPC tool 122, shown in FIG. 1, or Netcool® from IBM®, not shown); online communities or forums (such as GitHub®) with labels and tags for structured and unstructured discussions; instant messaging or file sharing services (such as Slack®) with unformatted text; micro-service or configuration item log in databases that track when maintenance personnel log in to the configuration items, which use structured data; or configuration item change logs that detail when and what maintenance has been performed on a configuration item. The relevant information well (and the relevant information sources themselves) can include structured and unstructured data (including formatted and unformatted text) related to the configuration items. For example, an IPC tool may have formatted text boxes for entering the date, time, and duration of maintenance of a configuration item, and the IPC tool may also have unformatted text boxes where a user (such as user 128, shown in FIG. 1) can add notes, such as why the maintenance is being performed or what is being done during the maintenance.

At polygon 312, the suppressing tool monitors the relevant information well to find relevant data regarding the configuration items. At polygon 314, the structured/formatted data is analyzed to find maintenance events, which are defined by what type of maintenance will be performed; which configuration items are affected; what date, time, and duration the maintenance will be; and which information source the data originated from. At polygon 316, the unstructured/unformatted data is analyzed, for example, using NLP techniques, to find maintenance events, which are defined by what type of maintenance will be performed; which configuration items are affected; what date, time, and duration the maintenance will be; and which information source the data originated from.

At polygon 318, the analyses from polygons 314 and 316 are combined to form events which are weighted according to their information source to calculate a score. In some embodiments, a single event that is reported on by more than one information source has all of its scores added together for a final score. In some situations, there may be multiple reports of events from different sources where the events share some of the same details and/or overlap in some way(s). There can be several approaches to dealing with such situations, and in some embodiments, the events are joined such that the resulting event has the broadest details set forth in either of the events. For a specific example of this situation, if Event 1 states that configuration items A, B, and C will be in maintenance mode due to a release on Mar. 1, 2019 from 09:00 to 13:00 and Event 2 states that configuration items A, B, C, and D will be in maintenance mode due to a release on Mar. 1, 2019 from 10:00 to 14:00, then the union of Event 1 and Event 2 will be Event 3 which will include configuration items A, B, C, and D that will be in maintenance mode on due to a release Mar. 1, 2019 from 09:00 to 14:00. Furthermore, in a scheme that combines overlapping events, the resultant joined Event 3 can be scored by adding the score of Events 1 and 2. Alternatively, the score of Event 3 can be based on the union of Events 1 and 2 prior to being weighted, with the weighting being the average of the weights of Events 1 and 2. This may lead to a different result, for example, in the situation where Events 1 and 2 have different types, but Event 3 is selected to have only one of the two types, in polygon 318. As another alternative, the type that has a higher weight may be selected as the type for Event 3 in polygon 318.

At polygon 320, the (final) score is compared to a predetermined threshold to determine if it passes or fails. If the (final) score is less than the threshold (i.e., a fail), then method 300 can recursively return to polygon 312 to find more evidence of events. If the (final) score is greater than or equal to the threshold (i.e., a pass), then suppressing tool stores the event at polygon 321. Thereby, the affected configuration items will be denoted as being in maintenance mode for the specified date, time, and duration of the event. In some embodiments, additional time can be added to the front end to prevent the MEM tool from starting work on the affected configuration items, which may end up being unnecessary or could delay the maintenance that is supposed to be performed. For example, the maintenance mode can be entered one hour before the maintenance is supposed to occur (i.e., the beginning of the event can be moved earlier by one hour). In some embodiments, additional time can be added to the back end to prevent the MEM tool from attempting to address an issue in case the maintenance takes longer than expected. For example, the maintenance mode can extend an extra hour after the maintenance is supposed to have been completed (i.e., the ending of the event can be moved later by one hour).

At polygon 322, the affected configuration items are designated as being in maintenance mode according to the details of the event. As stated previously, when a configuration item is in maintenance mode, alerts from a MEM tool (such as MEM tool 120, shown in FIG. 1) are suppressed, for example, by a user (such as user 128, shown in FIG. 1), through an application programming interface (API), or with robotic process automation (RPA). The specifics of how suppression can be accomplished can vary, for example, it can occur by the suppressing tool entering a maintenance event into the IPC tool, which the MEM can access to regulate its own activities; shutting down or disconnecting the MEM tool from the configuration item being maintained; preventing automated action by the MEM tool on the configuration item being maintained; preventing an alert related to a configuration item being maintained from progressing through the MEM tool; by the MEM tool consulting with the suppressing tool after alert-worthy behavior is detected but before the alert is raised or remedial action is taken; and/or intercepting the actual performance values from the configuration item being maintained and feeding simulated normal or null performance values to the MEM tool.

In some embodiments, the suppression of alerts applies to any alert related to the affected configuration items. In other embodiments, the suppression is selective such that certain alerts will be suppressed while others can proceed normally. For example, if an operating system update for a server is being performed, then the server will be in maintenance mode and alerts relating to the operating system update will be suppressed. However, if there are alerts that are unrelated to the operating system update (for example, a hard drive failure), then those alerts will proceed normally, as if the server was not in maintenance mode. In such embodiments, the details of the event may include more specific information as to what is being done to the affected configuration items.

At polygon 323, the affected configuration items are ceased being designated as being in maintenance mode due to, for example, the termination of the event according to the event details, intervention from a user, review of microservice login information (for example, to see if a user has logged in and then logged out recently), or review of change logs to see if the maintenance that was to be performed during the event has been completed. Thereby, at polygon 323, the MEM tool can resume normal monitoring of the affected configuration items. At polygon 324, method 300 ends with the suppressing tool being deactivated.

In some embodiments, aspects of method 300 are recursive. For example, at any of polygons 321-323, method 300 can return to polygon 312 to find more evidence of events. This return can occur while the method is executing any of polygons 321-323 and can occur, for example periodically (such as every fifteen minutes). Thereby, method 300 can monitor and process multiple events at a given time. In other words, when alerts are being suppressed for one event, method 300 does not solely focus on that one event. Instead, method 300 can continue to run in search of other evidence of events and/or to commence and cease maintenance mode for other events.

The features of method 300 allow for a computing infrastructure to find maintenance information about its configuration items automatically. Subsequently, this information can be used to denote that certain configuration items will be in maintenance mode. Thereby, alerts that are caused by the maintenance being performed will be suppressed. This prevents a MEM tool from interceding and initiating corrective actions to "fix" issues that are purposefully being caused in an effort to maintain the configuration items. Thus, the maintenance can be performed without unnecessary interference from a well-intentioned MEM tool.

FIG. 4 shows weighting table 400 of information sources versus maintenance types according to an embodiment of the present disclosure. In the illustrated embodiment, the rows in table 400 are related to the different maintenance types (i.e., installation or release of a configuration item, update or regularly scheduled maintenance on a configuration item, and failure of a configuration item), and the columns in table 400 are related to the different information sources (i.e., IPC Tool, instant messaging service, online forum or community, micro-service log in, and change log). It is to be understood that weighting table 400 is provided by way of example only and that other configurations of a weighting table can be used in other embodiments. For example, the specific values of the maintenance types, information sources, and weights can vary in other embodiments.

As stated previously, each of the several relevant sources of information can be weighted according to importance (which may be based on, for example, the perceived relevance, authority, and/or veracity of the information source). In addition, the weights can be dependent on what type of maintenance is at issue. For example, in the illustrated embodiment, an update or regularly scheduled maintenance event reported on an IPC tool has a weight of three, whereas an installation or release event reported on an IPC tool has a weight of one, and an installation or release event reported on an instant messaging service has a weight of two.

In some embodiments, when an event is reported by a source, the initial value is one. Then the initial value is multiplied by the appropriate weight to determine the score for the event. If the event is found on multiple sources, then the scores from each source can be added for a total score. On the other hand, if an event is only found on one source but not in the others, then the initial value for the other sources is zero (and the total score would be the same as the single event score).

As stated previously, the total score can then be compared to a threshold. If the total score is greater than or equal to the threshold, then the event is scheduled so that the affected configuration items will be denoted as being in maintenance mode when the time comes. In some embodiments, the threshold can be relatively low, for example, one, such that any evidence of an event means an event is scheduled. In some embodiments, the threshold can be moderate, for example, three. In such embodiments, evidence from one highly-weighted source will be enough to cause the scheduling of the event, but it would take evidence from multiple moderately or lowly-weighted sources to cause the scheduling. In some embodiments, the threshold can be high, for example, seven. In such embodiments, evidence from at least three different sources is required for the event to be scheduled.

Because method 300 (shown in FIG. 3) is recursive in finding events, an event can be detected on separate sources on separate monitoring sweeps of the relevant information sources. Therefore, when an event is detected on one source, that evidence is logged in the suppressing tool, but if there is not a high enough score to meet the threshold, then the event is not yet scheduled to invoke the maintenance mode. If on a subsequent sweep, that event is found in another source, then it can be scored, and a total score can be had by adding the two event scores together. In other words, the process of finding the total score and comparing it to the threshold is also recursive.

In some embodiments, an initial value of negative one is possible as well. This could occur in situations where the evidence indicates that an event will not occur. This evidence can be present in a source on its own, or it can come after the event was positively stated in that source. For the latter case, in some embodiments, the resulting initial value would be negative one, although in some other embodiments, the resulting initial value would be zero (from adding the positive one to the negative one). If the initial value is negative one, then the weighted event score would also be negative. Thereby, the total score will be lower than if there were no negative initial values, so an event that otherwise has a high enough score to pass the threshold may fail the threshold. In addition, in some embodiments, the weights can be different for a negation of an event than for an affirmation of an event. In such embodiments, the negative weights can be greater than or less than the positive weights, or a mixture thereof can be employed.

In some embodiments, the evidence of negation can be derived from an indication that an ongoing maintenance event has been completed. Such evidence indicates that the affected configuration items should no longer be in maintenance mode. For example, the micro-service log in source can indicate a maintenance event by indicating that a user (such as user 128, shown in FIG. 1) is logged in to maintain a configuration item. This would result in a positive score. If later on the user logs out, that can be an indication that the maintenance is complete. Such an indication can be made stronger if the time between log in and log out is similar to the expected duration of the maintenance event. Similarly, if a change log shows a new change that corresponds to the reason for the maintenance, that can be an indication that the maintenance has been completed. Either of these would result in a less positive score that, in some embodiments, would indicate that the event should be canceled and that the affected configuration items should be taken out of maintenance mode. This would allow the MEM tool to resume monitoring the affected configuration items at that time instead of delaying until the maintenance mode is scheduled to be terminated.

In some embodiments, the weights can be used to reconcile two events with overlapping details. For example, the difference in time between the event according to one source and the event according to another source can be settled by weight. For a specific example, if a forum states that an installation or release event begins at 08:00 but an IPC tool states that it begins at 09:00, then the event can be scheduled to begin at 8:15 since the forum weight is three times greater than the IPC tool weight.

The feature of weighting the different sources allows for emphasis or deemphasis of sources based on their relative importance in different situations. This permits a more nuanced response to evidence of a maintenance event, so a higher accuracy of the activation and deactivation of the suppressing tool can be achieved.

Figure 5:
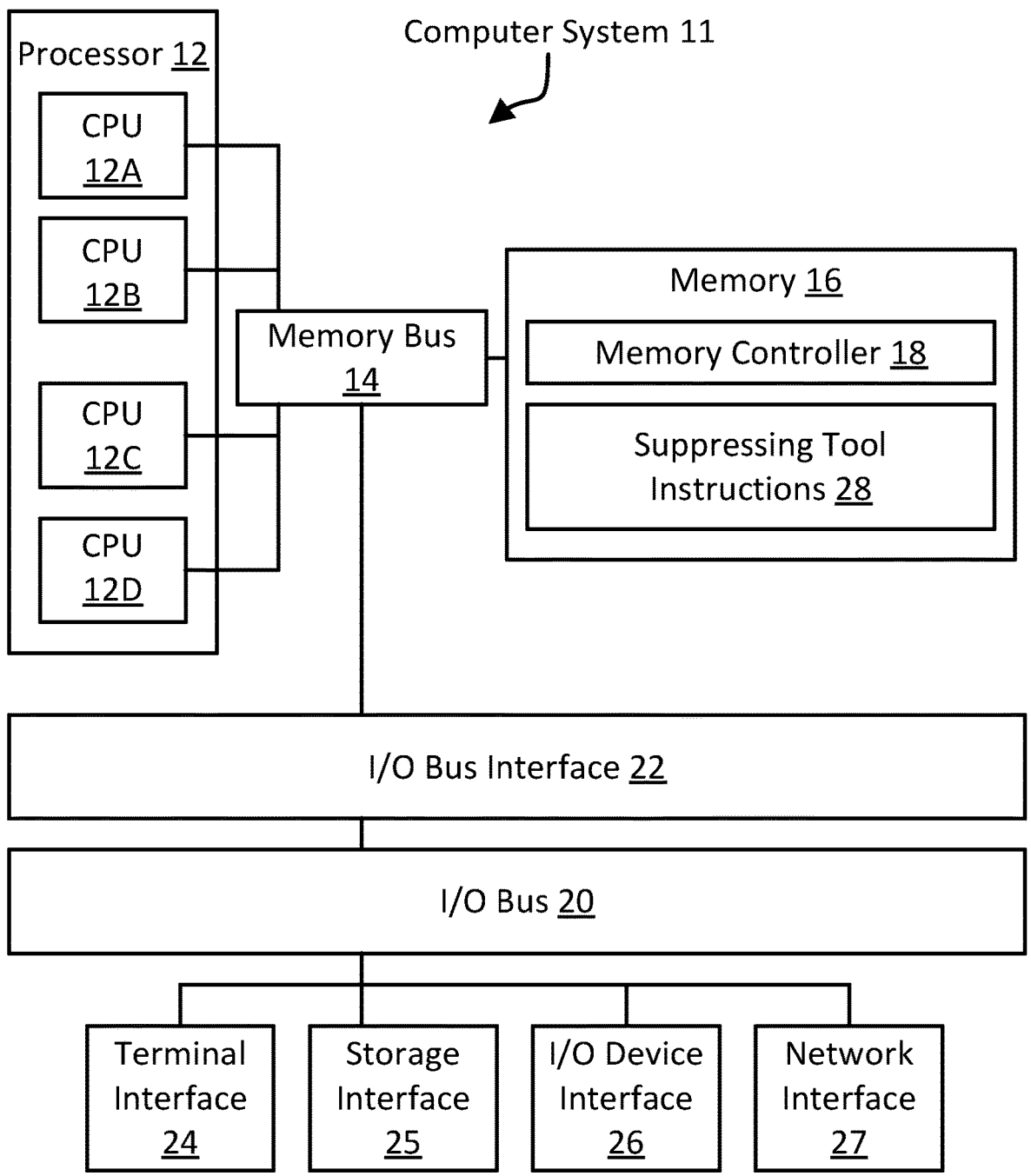
FIG. 5 shows a high-level block diagram of an example computer system that may be used in implementing embodiments of the present disclosure.

Referring now to FIG. 5, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. In some embodiments, the components of the computer system 11 may comprise one or more CPUs 12, a memory subsystem 16, a terminal interface 24, a storage interface 25, an I/O (Input/Output) device interface 26, and a network interface 27, all of which may be communicatively coupled, directly or indirectly, for inter-component communication via a memory bus 14, an I/O bus 20, and an I/O bus interface unit 22.

The computer system 11 may contain one or more general-purpose programmable central processing units (CPUs) 12A, 12B, 12C, and 12D, herein generically referred to as the processer 12. In some embodiments, the computer system 11 may contain multiple processors typical of a relatively large system; however, in other embodiments the computer system 11 may alternatively be a single CPU system. Each CPU 12 may execute instructions stored in the memory subsystem 16 and may comprise one or more levels of on-board cache.

In some embodiments, the memory subsystem 16 may comprise a random-access semiconductor memory, storage device, or storage medium (either volatile or non-volatile) for storing data and programs. In some embodiments, the memory subsystem 16 may represent the entire virtual memory of the computer system 11 and may also include the virtual memory of other computer systems coupled to the computer system 11 or connected via a network. The memory subsystem 16 may be conceptually a single monolithic entity, but, in some embodiments, the memory subsystem 16 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 16 may contain elements for control and flow of memory used by the Processor 12. This may include a memory controller 18.

Although the memory bus 14 is shown in FIG. 5 as a single bus structure providing a direct communication path among the CPUs 12, the memory subsystem 16, and the I/O bus interface 22, the memory bus 14 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 22 and the I/O bus 20 are shown as single respective units, the computer system 11 may, in some embodiments, contain multiple I/O bus interface units 22, multiple I/O buses 20, or both. Further, while multiple I/O interface units are shown, which separate the I/O bus 20 from various communications paths running to the various I/O devices, in other embodiments some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 16 further includes suppressing tool instructions 28. The execution of suppressing tool instructions 28 enables computer system 11 to perform one or more of the functions described above for suppressing alerts of a MEM tool (for example, method 300, shown in FIG. 3).

It is noted that FIG. 5 is intended to depict representative components of an exemplary computer system 11. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
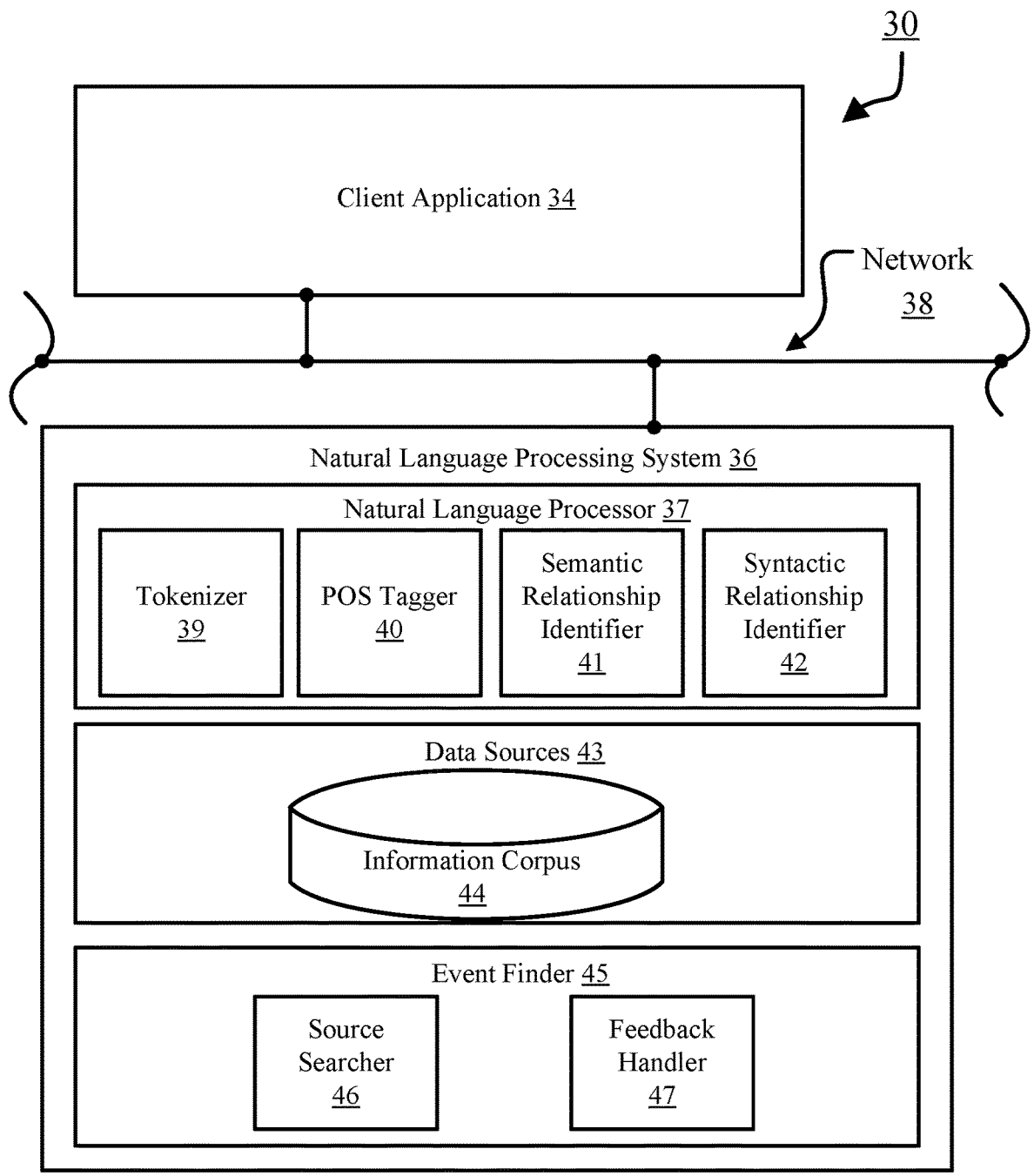
FIG. 6 shows a block diagram of an example natural language processing system configured to provide relevant information to a suppressing tool regarding maintenance events, according to an embodiment of the present disclosure.

FIG. 6 shows a block diagram of an example natural language processing system configured to provide relevant information to a suppressing tool (such as suppressing tool 124, shown in FIG. 1) regarding maintenance events, according to an embodiment of the present disclosure. Aspects of FIG. 6 are directed toward an exemplary system architecture 30, including a natural language processing system 36, to suppress alerts. In some embodiments, a suppressing tool (such as suppressing tool 124, shown in FIG. 1) may submit electronic source documents to be modified to the natural language processing system 36 which may be housed on an IT system (such as IT system 105, shown in FIG. 1). Such a suppressing tool may include a client application 34 which may itself involve one or more entities operable to generate or modify information in source documents which are then dispatched to natural language processing system 36 via network 38.

Consistent with various embodiments, natural language processing system 36 may find evidence regarding current or future maintenance events and the details thereof. In some embodiments, natural language processing system 36 may include natural language processor 37, data sources 43, and event finder 45. Natural language processor 37 may be a computer module that analyzes the received source documents and other electronic documents. Natural language processor 37 may perform various methods and techniques for analyzing electronic documents (syntactic analysis, semantic analysis, etc.). The natural language processor 37 may be configured to recognize and analyze any number of natural languages. In some embodiments, natural language processor 37 may parse passages of the documents. Further, natural language processor 37 may include various modules to perform analyses of electronic documents. These modules may encompass, but are not limited to, a tokenizer 39, part-of-speech (POS) tagger 40, semantic relationship identifier 41, and syntactic relationship identifier 42.

In some embodiments, tokenizer 39 may be a computer module that performs lexical analysis. Tokenizer 39 may convert a sequence of characters into a sequence of tokens. A token may be a string of characters included in an electronic document and categorized as a meaningful symbol. Further, in some embodiments, tokenizer 39 may identify word boundaries in an electronic document and break any text passages within the document into their component text elements, such as words, multiword tokens, numbers, and punctuation marks. In some embodiments, tokenizer 39 may receive a string of characters, identify the lexemes in the string, and categorize them into tokens.

Consistent with various embodiments, POS tagger 40 may be a computer module that marks up a word in passages to correspond to a particular part of speech. POS tagger 40 may read a passage or other text in natural language and assign a part of speech to each word or other token. POS tagger 40 may determine the part of speech to which a word (or other text element) corresponds based on the definition of the word and the context of the word. The context of a word may be based on its relationship with adjacent and related words in a phrase, sentence, question, or paragraph. In some embodiments, the context of a word may be dependent on one or more previously analyzed electronic documents (e.g., the content of one source document may shed light on the meaning of text elements in another source document). Examples of parts of speech that may be assigned to words include, but are not limited to, nouns, verbs, adjectives, adverbs, and the like. Examples of other part of speech categories that POS tagger 40 may assign include, but are not limited to, comparative or superlative adverbs, wh-adverbs (e.g., when, where, why, whence, whereby, wherein, whereupon), conjunctions, determiners, negative particles, possessive markers, prepositions, wh-pronouns (e.g., who, whom, what, which, whose), and the like. In some embodiments, POS tagger 40 may tag or otherwise annotate tokens of a passage with part of speech categories. In some embodiments, POS tagger 40 may tag tokens or words of a passage to be parsed by natural language processing system 36.

In some embodiments, semantic relationship identifier 41 may be a computer module that may identify semantic relationships of recognized text elements (e.g., words, phrases) in documents. For example, semantic relationship identifier 41 may be able to recognize evidence of events and event details such as what configuration item is involved what type of maintenance will be performed; which configuration items are affected; and what date, time, and duration the maintenance will be. In some embodiments, semantic relationship identifier 41 can recognize terminology relating to a configuration item or subcomponent thereof, such as names of specific machines or programs, change IDs, customer calls, and html queries. In some embodiments, semantic relationship identifier 41 may determine functional dependencies between entities and other semantic relationships.

Consistent with various embodiments, syntactic relationship identifier 42 may be a computer module that may identify syntactic relationships in a passage composed of tokens. Syntactic relationship identifier 42 may determine the grammatical structure of sentences, for example, which groups of words are associated as phrases and which word is the subject or object of a verb. Syntactic relationship identifier 42 may conform to formal grammar.

In some embodiments, natural language processor 37 may be a computer module that may parse a document and generate corresponding data structures for one or more portions of the document. For example, in response to receiving a source document at natural language processing system 36, natural language processor 37 may output parsed text elements from the document as data structures. In some embodiments, a parsed text element may be represented in the form of a parse tree or other graph structure. To generate the parsed text element, natural language processor 37 may trigger computer modules 39-42. Event finder 45 can use functionality provided by computer modules 39-42 individually or in combination. Additionally, in certain embodiments, event finder 45 may use external computer systems for dedicated tasks that are part of the evidence finding process.

In some embodiments, the output of natural language processor 37 may be used by event finder 45 to perform a search of a set of (i.e., one or more) corpora to retrieve evidence of maintenance events. As used herein, a corpus may refer to one or more data sources. In some embodiments, data sources 43 may include data warehouses, information corpora, data models, and document repositories. In some embodiments, the data source 43 may include an information corpus 44. The information corpus 44 may enable data storage and retrieval. In some embodiments, the information corpus 44 may be a storage mechanism that houses a standardized, consistent, clean and integrated form of potential target documents. The data may be sourced from various operational systems. Data stored in the information corpus 44 may be structured in a way to specifically address reporting and analytic requirements. In some embodiments, the information corpus may be a relational database.

In some embodiments, event finder 45 may be a computer module that searches through documents to find evidence of maintenance events. In some embodiments, event finder 45 may include source searcher 46 and feedback handler 47. In some embodiments, feedback handler 47 can be a computer module that processes feedback from users (for example user 128, shown in FIG. 1) on the evidence for maintenance events generated by event finder 45. In some embodiments, users may be engaged in dialog with natural language processing system 36 to evaluate the relevance and meaning of the evidence. In certain embodiments, the feedback of users on these lists may be used for future natural language processing sessions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
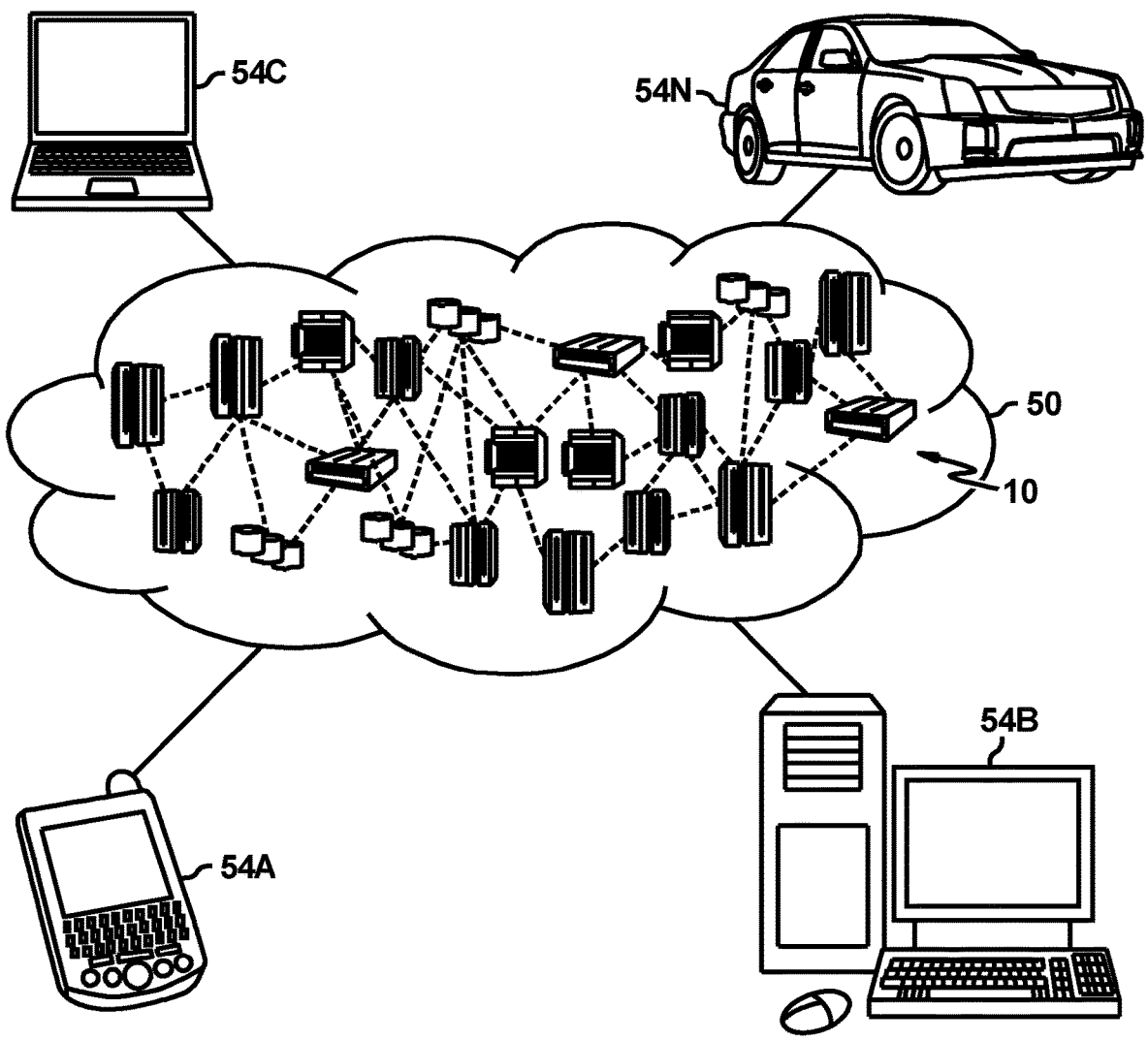
FIG. 7 depicts a cloud computing environment according to an embodiment of the present disclosure.
Figure 8:
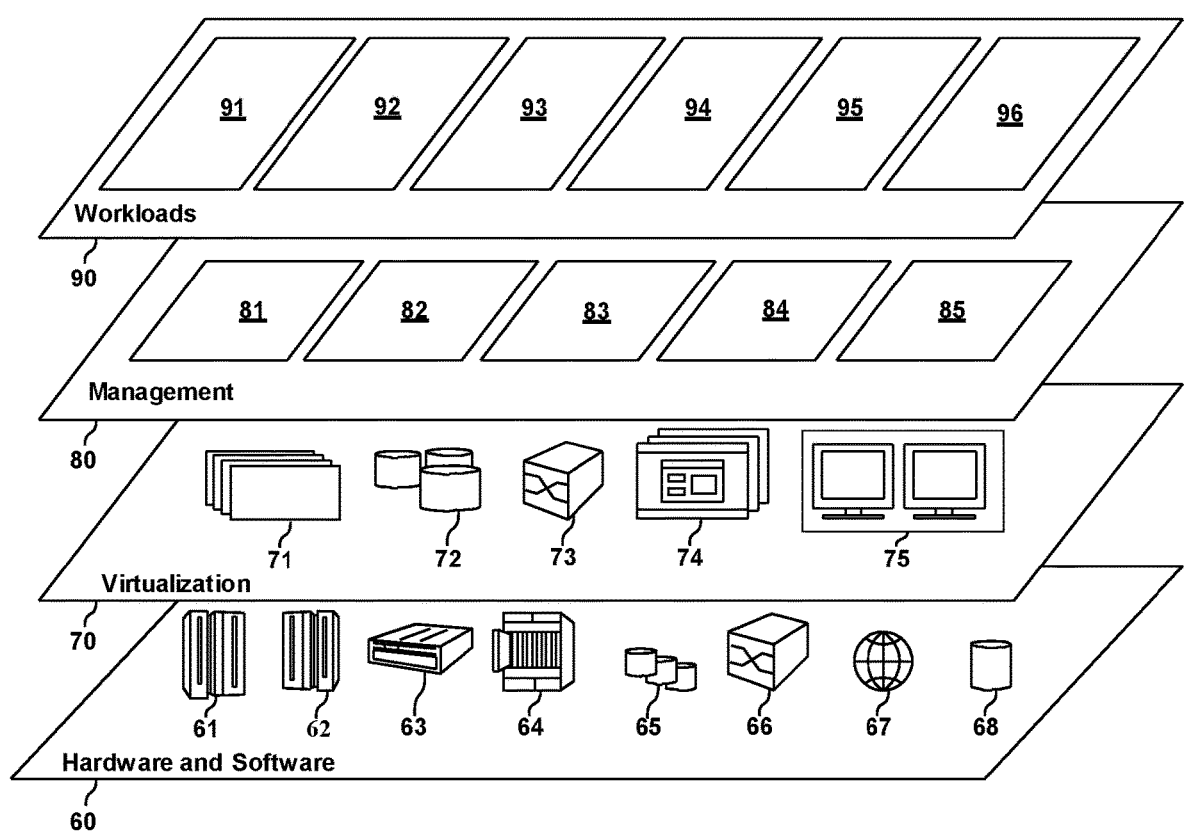
FIG. 8 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and suppressing tool 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
monitoring unformatted text related to a configuration item in a first relevant source;
analyzing the unformatted text using a natural language processing system;
determining that the configuration item has a first maintenance event wherein the configuration item is to be maintained in response to the analysis of the unformatted text;
designating that the configuration item is in a maintenance mode;
suppressing alerts related to the configuration item while the configuration item is in the maintenance mode;
determining that the configuration item has a second maintenance event wherein the configuration item is to be maintained in response to the analysis of the unformatted text, wherein the first maintenance event and the second maintenance event overlap;
joining the first maintenance event and the second maintenance event into a third maintenance event; and
designating that the configuration item is in the maintenance mode during the third maintenance event.

2. The method of claim 1, wherein the first relevant source is selected from the group consisting of: an online community or forum, an instant messaging or file sharing service, a micro-service or configuration item login database, or a configuration item change log.

3. The method of claim 1, wherein the suppressing alerts comprises:
intercepting actual performance values from the configuration item; and
feeding simulated performance values to a monitoring and event management tool such that the monitoring and event management tool cannot detect alert-worthy behavior by the configuration item.

4. The method of claim 1, further comprising:
monitoring unformatted text related to the configuration item in a second relevant source.

5. The method of claim 1, further comprising:
ceasing designating that the configuration item is in the maintenance mode according to a termination of the first maintenance event.

6. The method of claim 1, wherein analyzing the unformatted text using a natural language processing system comprises:
discovering what type of maintenance will be performed; which configuration items are affected; and what date, time, and duration the first maintenance event will be.

7. A method comprising:
monitoring first information related to a configuration item in a first relevant source, wherein the first information includes unformatted text;
monitoring second information related to the configuration item in a second relevant source;
analyzing the unformatted text using a natural language processing system;
weighting the first information and the second information based on a first information source and a second information source, respectively;
adding the weighted first information and the weighted second information to calculate a score;
comparing the score to a threshold;
determining that the configuration item has a first maintenance event wherein the configuration item is to be maintained in response to the score being greater than or equal to the threshold;
designating that the configuration item is in a maintenance mode; and
suppressing alerts related to the configuration item while the configuration item is in the maintenance mode.

8. The method of claim 7, wherein the weighted first information has a negative value that indicates against the first maintenance event occurring.

9. The method of claim 8, wherein the comparing the score to a threshold is recursive such that the negative value ends the first maintenance event.

10. The method of claim 9, further comprising:
comparing the score to the threshold recursively;
determining that the configuration item does not have the first maintenance event in response to the recursively comparing the score to the threshold; and
undesignating that the configuration item is in the maintenance mode in response to determining that the configuration item does not have the first maintenance event.

11. The method of claim 7, further comprising:
determining that the configuration item has a second maintenance event wherein the configuration item is to be maintained in response to the analysis of the unformatted text, wherein the first maintenance event and the second maintenance event overlap;
joining the first maintenance event and the second maintenance event into a third maintenance event; and
designating that the configuration item is in the maintenance mode during the third maintenance event.

12. The method of claim 7, further comprising:
ceasing designating that the configuration item is in the maintenance mode according to a termination of the first maintenance event.

13. A method comprising:
monitoring unformatted text related to a configuration item in a first relevant source;
analyzing the unformatted text using a natural language processing system;
monitoring information related to the configuration item in a second relevant source;
weighting the unformatted text and the information;
adding the weighted unformatted text and the weighted information to calculate a score;
comparing the score to a threshold;
determining that the configuration item has a first maintenance event wherein the configuration item is to be maintained in response to the score being greater than or equal to the threshold;
designating that the configuration item is in a maintenance mode; and
suppressing alerts related to the configuration item while the configuration item is in the maintenance mode.

14. The method of claim 13, wherein the first relevant source is selected from the group consisting of: an online community or forum, an instant messaging or file sharing service, a micro-service or configuration item login database, or a configuration item change log.

15. The method of claim 13, wherein the suppressing alerts comprises:
   intercepting actual performance values from the configuration item; and
   feeding simulated performance values to a monitoring and event management tool such that the monitoring and event management tool cannot detect alert-worthy behavior by the configuration item.

16. The method of claim 13, further comprising:
   determining that the configuration item has a second maintenance event wherein the configuration item is to be maintained in response to the analysis of the unformatted text, wherein the first maintenance event and the second maintenance event overlap;
   joining the first maintenance event and the second maintenance event into a third maintenance event; and
   designating that the configuration item is in the maintenance mode during the third maintenance event.

17. The method of claim 13, further comprising:
   ceasing designating that the configuration item is in the maintenance mode according to a termination of the first maintenance event.

18. The method of claim 13, wherein the comparing the score to a threshold is recursive.

* * * * *